(12) United States Patent
Schell

(10) Patent No.: US 9,779,609 B2
(45) Date of Patent: Oct. 3, 2017

(54) TEMPERATURE THRESHOLD MONITORING SYSTEM

(71) Applicant: Thomas L. Schell, Pueblo, CO (US)

(72) Inventor: Thomas L. Schell, Pueblo, CO (US)

(*) Notice: Subject to any disclaimer, the term of this patent is extended or adjusted under 35 U.S.C. 154(b) by 0 days.

(21) Appl. No.: 14/838,286

(22) Filed: Aug. 27, 2015

(65) Prior Publication Data

US 2016/0063844 A1    Mar. 3, 2016

Related U.S. Application Data

(60) Provisional application No. 62/044,070, filed on Aug. 29, 2014.

(51) Int. Cl.
| | | |
|---|---|---|
| *G08B 17/00* | (2006.01) | |
| *G08B 21/18* | (2006.01) | |
| *G01K 1/02* | (2006.01) | |
| *G01K 3/00* | (2006.01) | |
| *G08B 25/08* | (2006.01) | |

(52) U.S. Cl.
CPC ............ *G08B 21/182* (2013.01); *G01K 1/02* (2013.01); *G01K 3/005* (2013.01); *G08B 25/08* (2013.01)

(58) Field of Classification Search
CPC ............................... G08B 21/182; G01K 1/02
USPC ......................................................... 340/584
See application file for complete search history.

(56) References Cited

U.S. PATENT DOCUMENTS

| | | | |
|---|---|---|---|
| 6,028,509 A | 2/2000 | Rice | |
| 6,263,272 B1 | 7/2001 | Liu et al. | |
| 6,922,622 B2 | 7/2005 | Dulin et al. | |
| 7,423,536 B2* | 9/2008 | Young | G08B 23/00 340/539.23 |
| 7,472,554 B2 | 1/2009 | Vosburgh | |
| 8,085,144 B2* | 12/2011 | Appelt | A61B 5/02055 128/201.22 |
| 8,618,926 B1 | 12/2013 | Thompson | |
| 9,020,536 B1* | 4/2015 | Crossno | G06Q 10/0833 455/456.1 |
| 2002/0189058 A1* | 12/2002 | Budden | G01K 1/14 24/488 |
| 2003/0222775 A1* | 12/2003 | Rackham | B60R 25/1004 340/457 |
| 2005/0024188 A1 | 2/2005 | Sider | |

(Continued)

OTHER PUBLICATIONS

U.S. Appl. No. 62/044,070, filed Aug. 29, 2015.

*Primary Examiner* — Eric M Blount
(74) *Attorney, Agent, or Firm* — Craig R. Miles; CR Miles P.C.

(57) ABSTRACT

A temperature threshold monitoring system for monitoring an ambient temperature within a discrete space, and methods of making and using such a temperature threshold monitoring system, whereby the temperature threshold monitoring system includes a temperature sensor and a microcontroller communicatively coupled to the temperature sensor. The microcontroller can be configured to generate an alert indicium when the temperature sensor senses an ambient temperature within the discrete space which corresponds to a predetermined low-temperature threshold or a predetermined high-temperature threshold. As to particular embodiments, the temperature threshold monitoring system can be configured for coupling to a dependent object within the discrete space.

20 Claims, 6 Drawing Sheets

(56) References Cited

U.S. PATENT DOCUMENTS

| | | | | |
|---|---|---|---|---|
| 2005/0244014 A1* | 11/2005 | Elko | ................ | G01K 11/22 |
| | | | | 381/58 |
| 2010/0081411 A1* | 4/2010 | Montenero | ........ | G08B 21/0233 |
| | | | | 455/404.2 |
| 2010/0100327 A1* | 4/2010 | Jensen | ................ | G01D 9/005 |
| | | | | 702/2 |
| 2011/0121956 A1 | 5/2011 | Rodriguez | | |
| 2011/0265706 A1* | 11/2011 | Nicholls | ............ | A41D 19/0027 |
| | | | | 116/201 |
| 2013/0332306 A1* | 12/2013 | Fahmy | ............... | G06Q 30/0282 |
| | | | | 705/26.7 |
| 2014/0149064 A1* | 5/2014 | Davidson | ................ | G06F 15/00 |
| | | | | 702/130 |
| 2014/0306838 A1* | 10/2014 | Beumler | ................. | B60N 2/28 |
| | | | | 340/988 |

\* cited by examiner

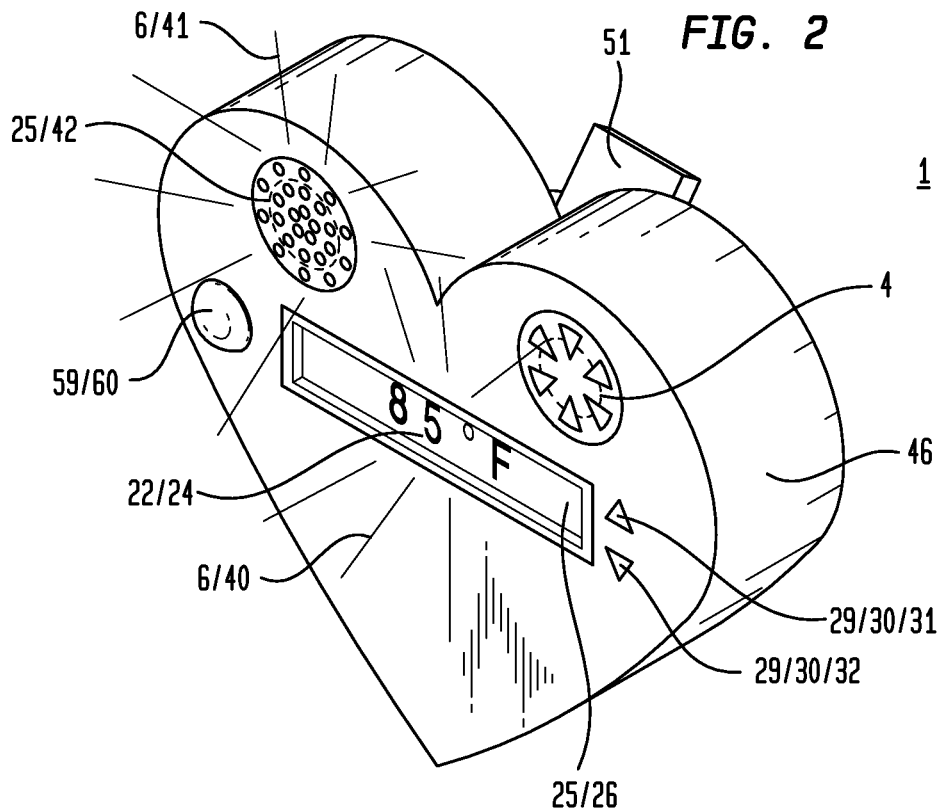
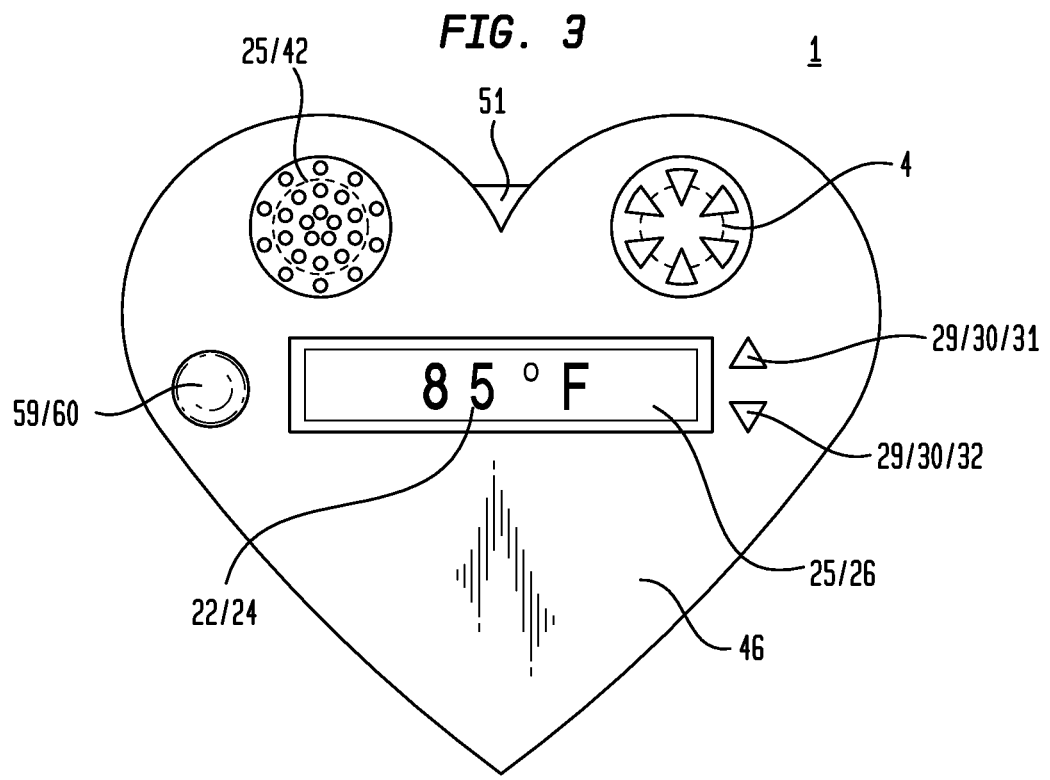

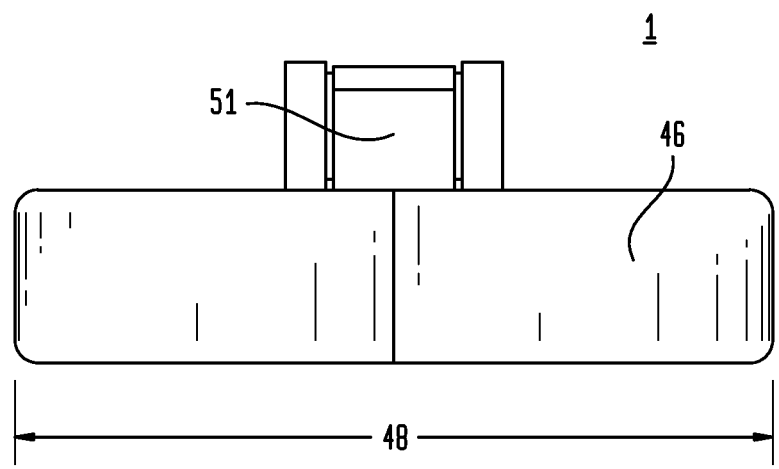
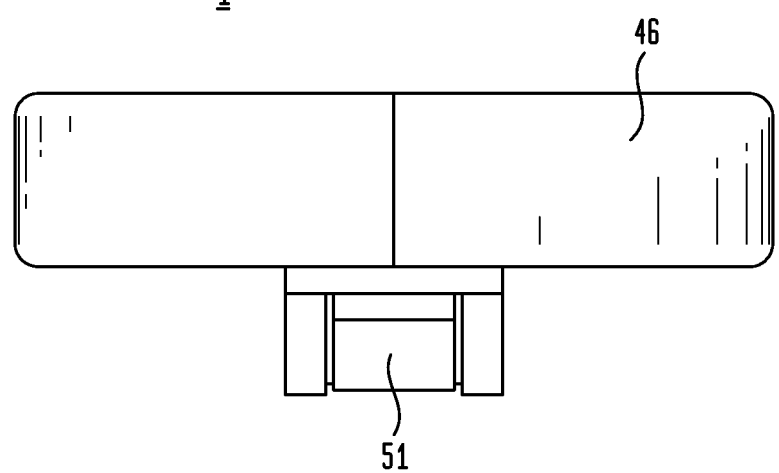

US 9,779,609 B2

TEMPERATURE THRESHOLD MONITORING SYSTEM

This United States Non-Provisional Patent Application claims the benefit of U.S. Provisional Patent Application No. 62/044,070, filed Aug. 29, 2014, hereby incorporated by reference herein.

I. SUMMARY OF THE INVENTION

A broad object of a particular embodiment of the invention can be to provide a temperature threshold monitoring system for monitoring an ambient temperature within a discrete space, and methods of making and using such a temperature threshold monitoring system, whereby the temperature threshold monitoring system includes a temperature sensor and a microcontroller communicatively coupled to the temperature sensor. The microcontroller can be configured to generate an alert indicium when the temperature sensor senses an ambient temperature within the discrete space which corresponds to a predetermined low-temperature threshold or a predetermined high-temperature threshold. As to particular embodiments, the temperature threshold monitoring system can be configured for coupling to a dependent object within the discrete space.

Naturally, further objects of the invention are disclosed throughout other areas of the specification, drawings, and claims.

II. A BRIEF DESCRIPTION OF THE DRAWINGS

FIG. 2 is a perspective view of a particular embodiment of the temperature threshold monitoring system.

FIG. 3 is a front view of a particular embodiment of the temperature threshold monitoring system.

FIG. 7 is a first end view of a particular embodiment of the temperature threshold monitoring system.

FIG. 8 is a second end view of a particular embodiment of the temperature threshold monitoring system.

III. DETAILED DESCRIPTION OF THE PREFERRED EMBODIMENTS

Figure 1:
FIG. 1 is an illustration of a method of using a particular embodiment of the temperature threshold monitoring system.
Figure 4:
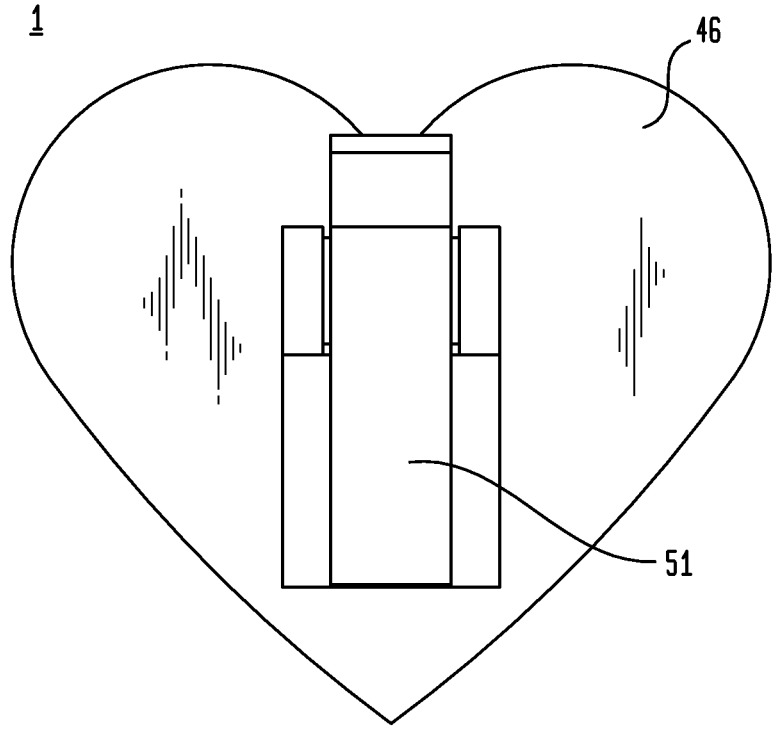
FIG. 4 is a rear view of a particular embodiment of the temperature threshold monitoring system.
Figure 5:
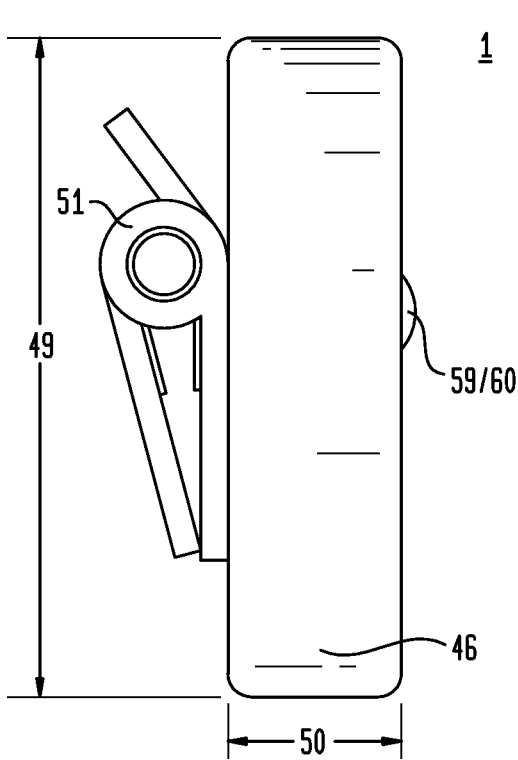
FIG. 5 is a first side view of a particular embodiment of the temperature threshold monitoring system.
Figure 6:
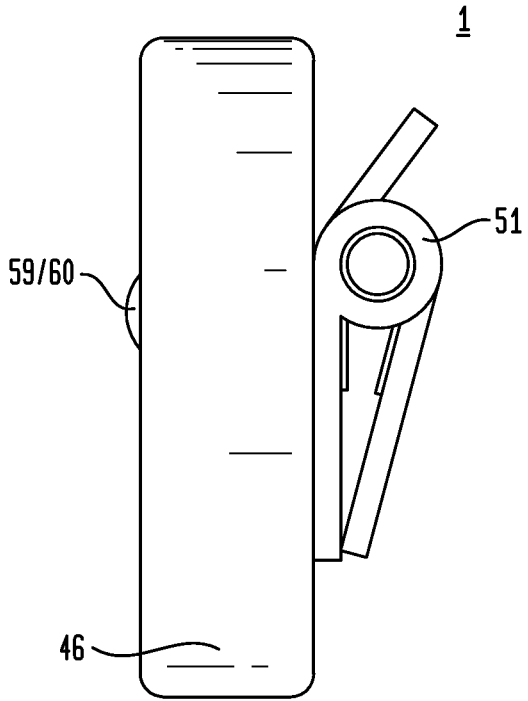
FIG. 6 is a second side view of a particular embodiment of the temperature threshold monitoring system.
Figure 9:
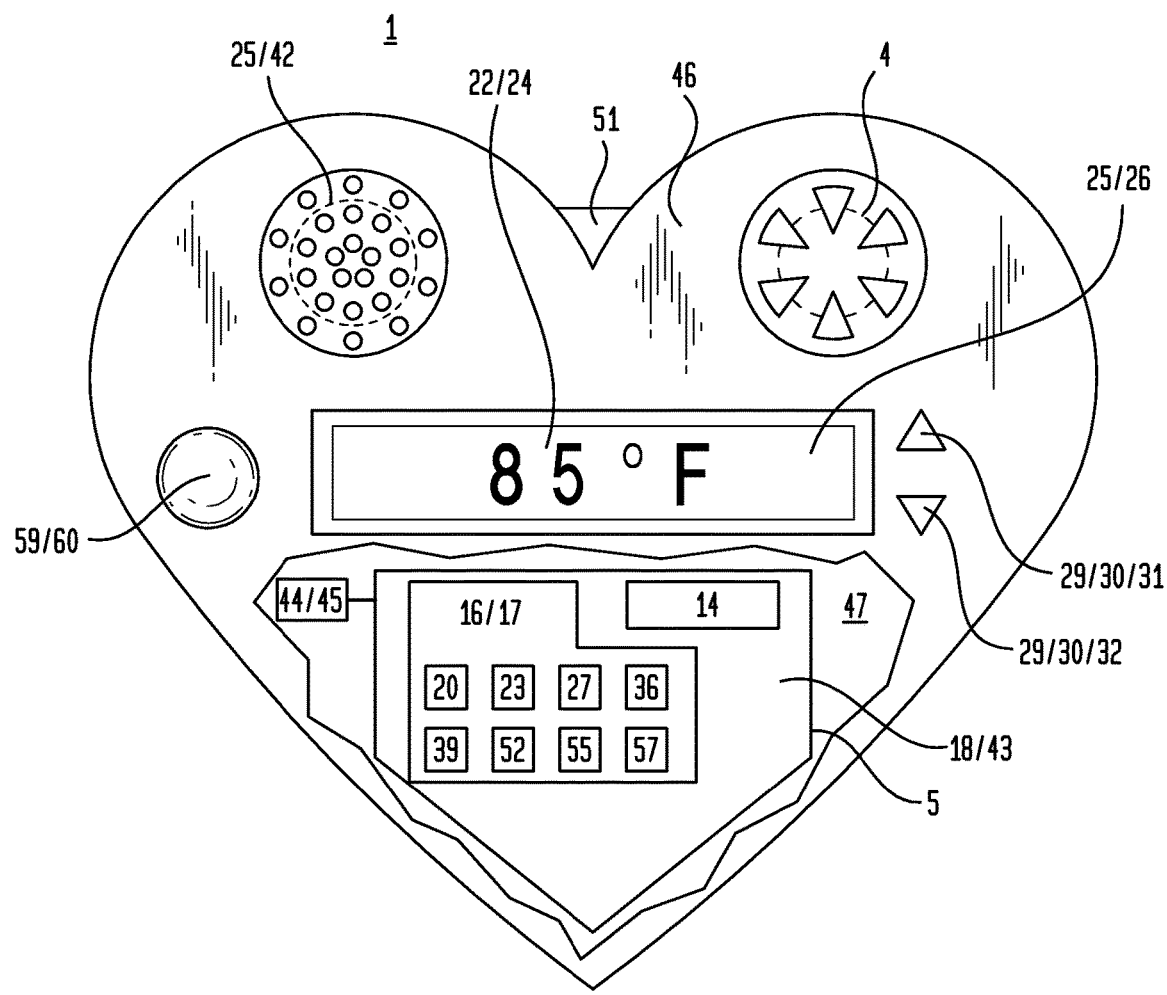
FIG. 9 is a front view of a particular embodiment of the temperature threshold monitoring system including a cutout to expose components of the microcontroller.

Now referring primarily to FIG. 1, which illustrates a method of using a particular embodiment of a temperature threshold monitoring system (1) for monitoring an ambient temperature (2) within a discrete space (3), whereby the temperature threshold monitoring system (1) includes a temperature sensor (4) and a microcontroller (5) communicatively coupled to the temperature sensor (4). The microcontroller (5) is configured to generate an alert indicium (6) when the temperature sensor (4) senses an ambient temperature (2) within the discrete space (3) which corresponds to a predetermined low-temperature threshold (7) or a predetermined high-temperature threshold (8). As to particular embodiments, the temperature threshold monitoring system (1) can be configured for coupling to a dependent object (9) within the discrete space (3). As but one illustrative example, the temperature threshold monitoring system (1) can be configured for surface-mounting proximate or on the dependent object (9) within the discrete space (3).

The term "discrete space" for the purposes of the present invention means a finite volume, which is defined by a volume perimeter. Typically, the ambient temperature (2) within the discrete space (3) differs from the ambient temperature (2) outside of the discrete space (3).

The term "dependent object" for the purposes of the present invention means an entity which depends or relies upon another. As to particular embodiments, the dependent object (9) can be a living entity, for example a human or an animal. As to other particular embodiments, the dependent object (9) can be a non-living entity, for example a temperature-sensitive consumable product, such as food or drink.

Again referring primarily to FIG. 1, the method of using the temperature threshold monitoring system (1) includes coupling the temperature threshold monitoring system (1) to a dependent object (9) within the discrete space (3) and monitoring the ambient temperature (2) within the discrete space (3).

As to particular embodiments, the dependent object (9) is dependent upon an extractor for extraction from the discrete space (3). Accordingly, the alert indicium (6) is configured to alert the extractor, whether directly or indirectly. Correspondingly, the method of using the temperature threshold monitoring system (1) can further include alerting the extractor, whereby the extractor can then extract the dependent object (9) from the discrete space (3).

Now referring primarily to FIG. 2 through FIG. 10, the temperature threshold monitoring system (1) includes a temperature sensor (4) capable of sensing an ambient temperature (2) within a discrete space (3). The temperature sensor (4) can take the form of a resistance temperature detector (RTD), a thermistor, a thermocouple, a thermostat, a semiconductor circuit, or the like, or other conventional temperature-sensing devices known to those of ordinary skill in the art. As an illustrative example, a suitable thermistor for use with embodiments of the temperature threshold monitoring system (1) can be obtained from Microchip Technology Inc., 2355 West Chandler Boulevard, Chandler, Ariz. 85224, USA, for example Part Number MCP98242. However, the invention need not be so limited, as any of a numerous and wide variety of similar or equivalent components can be suitable as a temperature sensor (4) capable of sensing an ambient temperature (2) within a discrete space (3).

The temperature sensor (4) is capable of sensing an ambient temperature (2) within the discrete space (3) which corresponds to a predetermined low-temperature threshold (7), a predetermined high-temperature threshold (8), or a combination thereof.

As to particular embodiments, exposure of the dependent object (9) to a temperature lesser than the predetermined low-temperature threshold (7) or greater than the predetermined high-temperature threshold (8) results in an undesirable condition of the dependent object (9).

The term "undesirable" for the purposes of the present invention means a condition which is not wanted. As non-limiting examples, the undesirable condition can be a detrimental condition, a harmful condition, a damaging condition, a disadvantageous condition, an unfavorable condition, an injurious condition, or the like, or combinations thereof. As to particular embodiments, the health or even the life of a living entity, for example a human or an animal may be adversely affected by an undesirable condition. As to other particular embodiments, the safety for consumption of a consumable product, for example food or drink, may be adversely affected by an undesirable condition.

In contrast to exposure of the dependent object (9) to a temperature lesser than the predetermined low-temperature threshold (7) or greater than the predetermined high-temperature threshold (8), exposure of the dependent object (9) to the predetermined low-temperature threshold (7) or the predetermined high-temperature threshold (8) does not result in the undesirable condition of the dependent object (9).

Accordingly, an alert indicium (6) generated when the temperature sensor (4) senses an ambient temperature (2) within the discrete space (3) which corresponds to the predetermined low-temperature threshold (7) or the predetermined high-temperature threshold (8) functions as a forewarning to forewarn that a temperature lesser than the predetermined low-temperature threshold (7) or greater than the predetermined high-temperature threshold (8) will likely be achieved, resulting in the undesirable condition of the dependent object (9) if the dependent object (9) is not extracted from the discrete space (3) by an extractor prior to achievement of the lesser or greater temperature.

The term "forewarning" for the purposes of the present invention means a warning given in advance of a likely-imminent state which may have undesirable consequences.

As to particular embodiments, the predetermined low-temperature threshold (7) can be less than about 10 degrees Celsius (° C.) or less than about 50 degrees Fahrenheit (° F.).

As to particular embodiments, the predetermined low-temperature threshold (7) can be selected from the group including or consisting of: less than about 10° C. (50° F.), less than about 5° C. (41° F.), less than about 0° C. (32° F.), less than about −5° C. (23° F.), less than about −10° C. (14° F.), less than about −15° C. (5° F.), less than about −20° C. (−4° F.), less than about −25° C. (−13° F.), less than about −30° C. (−22° F.), and less than about −35° C. (−31° F.).

As to particular embodiments, exposure of a living entity to a temperature lesser than the predetermined low-temperature threshold (7) can result in an undesirable condition, including as illustrative examples, frostnip, frostbite, hypothermia, loss of consciousness, death, or the like, or combinations thereof.

As to particular embodiments, the predetermined high-temperature threshold (8) can be greater than about 30 degrees Celsius (° C.) or greater than about 86 degrees Fahrenheit (° F.).

As to particular embodiments, the predetermined high-temperature threshold (8) can be selected from the group including or consisting of: greater than about 30° C. (86° F.), greater than about 32.5° C. (90.5° F.), greater than about 35° C. (95° F.), greater than about 37.5° C. (100° F.), greater than about 40° C. (104° F.), greater than about 42.5° C. (108.5° F.), greater than about 45° C. (113° F.), greater than about 47.5° C. (118° F.), greater than about 50° C. (122° F.), greater than about 52.5° C. (127° F.), greater than about 55° C. (131° F.), greater than about 57.5° C. (136° F.), and greater than about 60° C. (140° F.).

As to other particular embodiments, the predetermined high-temperature threshold (8) can be selected from the group including or consisting of: less than about 60° C. (140° F.), less than about 57.5° C. (136° F.), less than about 55° C. (131° F.), less than about 52.5° C. (127° F.), less than about 50° C. (122° F.), less than about 47.5° C. (118° F.), less than about 45° C. (113° F.), less than about 42.5° C. (108.5° F.), less than about 40° C. (104° F.), less than about 37.5° C. (100° F.), less than about 35° C. (95° F.), less than about 32.5° C. (90.5° F.), and less than about 30° C. (86° F.).

As to particular embodiments, exposure of a living entity to a temperature greater than the predetermined high-temperature threshold (8) can result in an undesirable condition, including as illustrative examples, overheating, heat exhaustion, heat cramps, heat syncope, heat rash, heatstroke, hyperthermia, loss of consciousness, death, or the like, or combinations thereof.

As to particular embodiments, exposure of a consumable product to a temperature greater than the predetermined high-temperature threshold (8) can result in an undesirable condition which, for example, may render the consumable product unsafe for consumption.

Again referring primarily to FIG. 2 through FIG. 10, the temperature threshold monitoring system (1) further includes a microcontroller (5) communicatively coupled to the temperature sensor (4), whereby the microcontroller (5) can receive, process, and transform a temperature sensor signal (13) generated by the temperature sensor (4).

As to particular embodiments, when the temperature threshold monitoring system (1) is in use, the temperature sensor (4) continuously senses the ambient temperature (2) within the discrete space (3) and continuously generates the temperature sensor signal (13) for receipt by the microcontroller (5).

As to other particular embodiments, when the temperature threshold monitoring system (1) is in use, the temperature sensor (4) continuously senses the ambient temperature (2) within the discrete space (3) and intermittently generates the temperature sensor signal (13) for receipt by the microcontroller (5).

As to yet other particular embodiments, when the temperature threshold monitoring system (1) is in use, the temperature sensor (4) intermittently senses the ambient temperature (2) within the discrete space (3) and intermittently generates the temperature sensor signal (13) for receipt by the microcontroller (5).

The microcontroller (5) is configured to generate an alert indicium (6) when the temperature sensor (4) senses an ambient temperature (2) within the discrete space (3) which corresponds to a predetermined low-temperature threshold (7) or a predetermined high-temperature threshold (8).

As to particular embodiments, the microcontroller (5) can be configured to generate an alert indicium (6) when the temperature sensor (4) senses an ambient temperature (2) within the discrete space (3) which corresponds to a predetermined low-temperature threshold (7) and a predetermined high-temperature threshold (8).

The microcontroller (5) can take the form of a small computer on one or more integrated circuits, whereby the microcontroller (5) can include at least one processor (14) which operatively controls the function of a variety of modules (15) stored as computer program code (16) in a programmable memory element (17), whereby each module (15) functions to provide a response related to the temperature sensor signal (13) received by the microcontroller (5). A bus (18) can operably couple components of the microcontroller (5), including without limitation, the processor (14) and the programmable memory element (17).

The microcontroller (5) can be a conventional microcontroller (5). As an illustrative example, a microcontroller (5) suitable for use with embodiments of the temperature threshold monitoring system (1) can be obtained from Microchip Technology Inc., 2355 West Chandler Boulevard, Chandler, Ariz. 85224, USA, for example Part Numbers PIC18F4620-I/PT, PIC18LF14K22, or PIC18LF15K22. However, the invention need not be so limited, as any of a numerous and wide variety of similar or equivalent components can be suitable as a microcontroller (5) programmable to perform the functions of the temperature threshold monitoring system (1) as described or shown herein.

The processor (14) can include one central-processing unit (CPU), a plurality of processors which operate in parallel to process digital information, a digital signal processor (DSP) plus a host processor, or the like, or other conventional processors (14) know to those of ordinary skill in the art.

The bus (18) can include any bus configuration having any of a wide variety of bus architectures.

The programmable memory element (17) can be a read only memory (ROM) or a random access memory (RAM), or both, or other conventional memory element (17) known to those of ordinary skill in the art.

Figure 10:
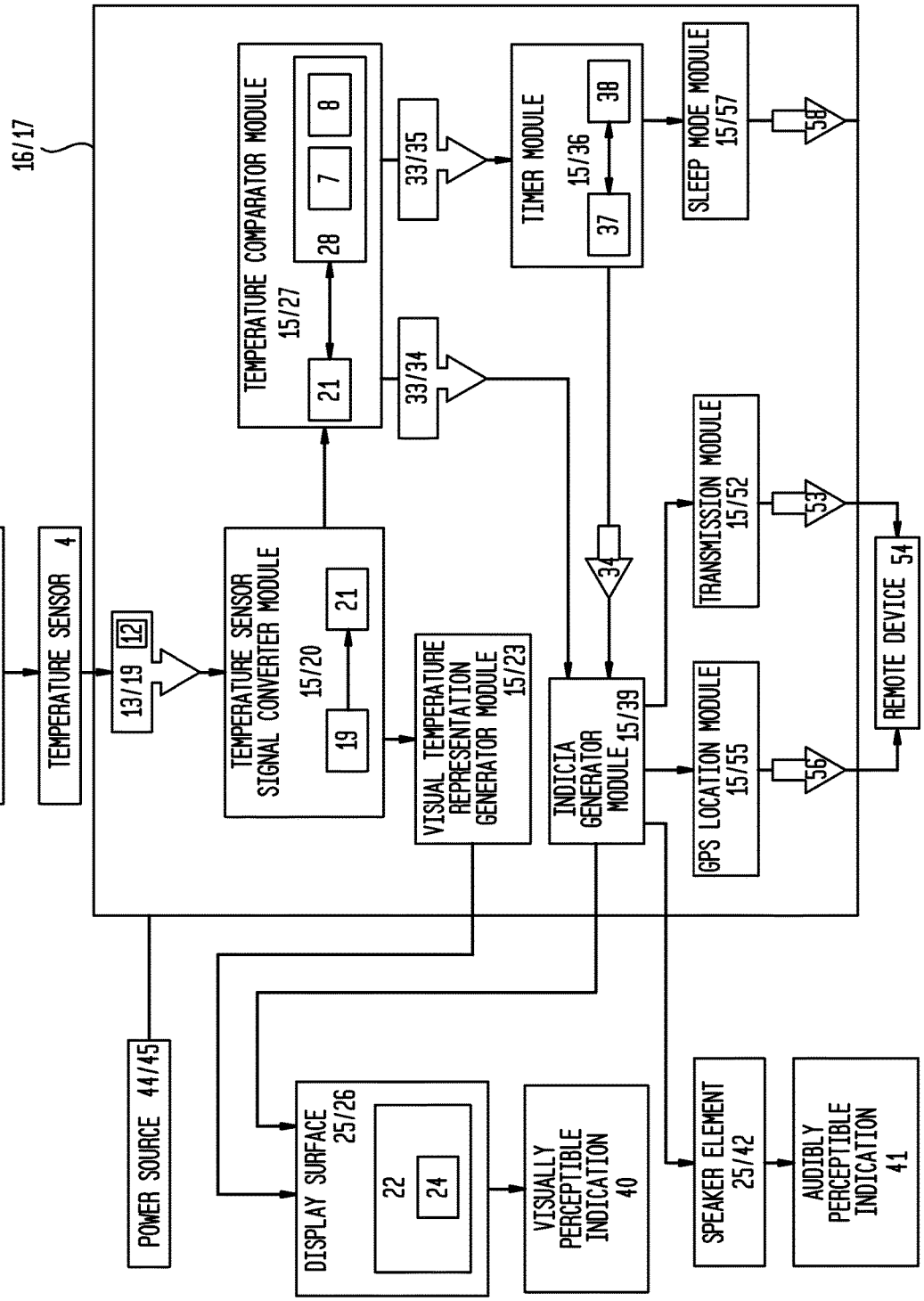
FIG. 10 is a block diagram representing various components of the temperature threshold monitoring system, including modules which carry out a variety of functions related to a temperature sensor signal generated by a temperature sensor.

Now referring primarily to FIG. 10, as to particular embodiments, the temperature sensor signal (13) generated by the temperature sensor (4) can be an analog temperature sensor signal (19), which can be received by the microcontroller (5). As to particular embodiments, a temperature sensor signal converter module (20) can convert the analog temperature sensor signal (19) into a digital temperature sensor signal (21).

A visual temperature representation (22) of the digital temperature sensor signal (21) can be generated by a visual temperature representation generator module (23), whereby the visual temperature representation (22) can be displayed as a sensed ambient temperature value (24) on a peripheral output element (25), such as a display surface (26).

The temperature threshold monitoring system (1) can further include a temperature comparator module (27) which can compare the sensed ambient temperature (12) provided as the digital temperature sensor signal (21) with a predetermined temperature threshold (28), whereby the predetermined temperature threshold (28) can be the predetermined low-temperature or high-temperature threshold (7)(8).

As to particular embodiments, an operator of the temperature threshold monitoring system (1) can enter commands or information into the microcontroller (5) to adjust the predetermined temperature threshold (28) by operator interaction with a user interface (29), such as one or more button elements (30), coupled to the bus (18). For example, operator interaction with a first button element (31) can decrease the predetermined temperature threshold (28) and operator interaction with a second button element (32) can increase the predetermined temperature threshold (28).

The temperature comparator module (27) can compare the sensed ambient temperature (12) with the predetermined temperature threshold (28) to determine if the sensed ambient temperature (12) is lesser or greater than the predetermined temperature threshold (28). The temperature comparator module (27) can then generate a temperature comparator signal (33) indicting whether the sensed ambient temperature (12) is lesser or greater than the predetermined temperature threshold (28). As to particular embodiments, the temperature comparator module (27) can compare the sensed ambient temperature (12) with a predetermined low-temperature threshold (7), generating an alert activation signal (34) when the sensed ambient temperature (12) is lesser than the predetermined low-temperature threshold (7). As to other particular embodiments, the temperature comparator module (27) can compare the sensed ambient temperature (12) with a predetermined high-temperature threshold (8), generating an alert activation signal (34) when the sensed ambient temperature (12) is greater than the predetermined high-temperature threshold (8). As to yet other particular embodiments, the temperature comparator module (27) can compare the sensed ambient temperature (12) with a predetermined low-temperature threshold (7) and a predetermined high-temperature threshold (8), generating an alert activation signal (34) when the sensed ambient temperature (12) is outside of the range defined by the predetermined low-temperature and high-temperature thresholds (7)(8).

When the sensed ambient temperature (12) is lesser than the predetermined low-temperature threshold (7) or greater than the predetermined high-temperature threshold (8), the temperature comparator module (27) can further generate a timer activation signal (35), which can be received by a timer module (36) to initiate a subsequent measurement of time. Following, the timer module (36) can compare the measured time (37) to a predetermined time period (38) to determine if the measured time (37) is lesser or greater than the predetermined time period (38). When the measured time (37) is greater than the predetermined time period (38), the timer module (36) can generate an alert activation signal (34). As an illustrative example, the timer module (36) can generate an alert activation signal (34) when the sensed ambient temperature (12) remains lesser or greater than the corresponding predetermined low-temperature or high-temperature threshold (7)(8) for a predetermined time period (38) of about five minutes. As to particular embodiments, an operator of the temperature threshold monitoring system (1) can enter commands or information into the microcontroller (5) to adjust the predetermined time period (38) as described above for the predetermined temperature threshold (28).

The alert activation signal (34) can be received by an indicium generator module (39) configured to generate an alert indicium (6) intended to alert an extractor, whether directly or indirectly, when the sensed ambient temperature (12) is lesser or greater than the corresponding predetermined low-temperature or high-temperature threshold (7)(8), when the measured time (37) is greater than the predetermined time period (38), or a combination thereof.

As to particular embodiments, the alert indicium (6) can include a visually perceptible indication (40) which can include any of a numerous and wide variety of visually perceptible indications (40) capable of alerting an observer of the visually perceptible indication (40).

The visually perceptible indication (40) can be observable by an observer observing the temperature threshold monitoring system (1), by an observer of a remote device (54) which receives a transmission signal (53) generated by a transmission module (52) of the temperature threshold monitoring system (1), or a combination thereof.

As to other particular embodiments, the alert indicium (6) can include an audibly perceptible indication (41) which can include any of a numerous and wide variety of audibly perceptible indications (41) capable of alerting a hearer of the audibly perceptible indication (41).

The audibly perceptible indication (41) can be hearable by a hearer listening to the temperature threshold monitoring system (1), by a hearer listening to a remote device (54)

which receives a transmission signal (53) generated by a transmission module (52) of the temperature threshold monitoring system (1), or a combination thereof.

As but one illustrative example, the audibly perceptible indication (41) can be a sound or series of sounds which emanate from a peripheral output element (25) of the temperature threshold monitoring system (1) or the remote device (54), such as a speaker element (42).

A printed circuit board (43) can be utilized to mechanically support and electrically connect the various electronic components of the temperature threshold monitoring system (1), which can be mounted to the printed circuit board (43) in any configuration or arrangement which allows the components to function as described or shown herein.

The temperature threshold monitoring system (1) can further include a power source (44) operatively coupled to the printed circuit board (43). As an illustrative example, the power source (44) can take the form of a battery (45), such as a AA battery, a AAA battery, a coin battery, or the like. The power source (44) can provide power to the electronic components coupled to the printed circuit board (43). For example, a first battery lead can connect the positive battery terminal of the printed circuit board (43) to the positive pole of the battery (45) and a second battery lead can connect the negative battery terminal of the printed circuit board (43) to the negative pole of the battery (45).

Now referring primarily to FIG. 2 through FIG. 9, embodiments of the temperature threshold monitoring system (1) can further include a housing (46) having a generally hollow interior space (47) of sufficient volume to house one or more of a temperature sensor (4); a microcontroller (5); a peripheral output element (25), such as a display surface (26) or a speaker element (42); a power source (44); and the associated circuitry.

The housing (46) can take the form any of a numerous and wide variety of configurations capable of housing the functional components of the temperature threshold monitoring system (1). As an illustrative example, the housing (46) can be configured as a generally heart-shaped housing (46), as shown in the example of the figures. However, the invention need not be so limited, as the housing (46) can take any form suitable for housing the functional components of the temperature threshold monitoring system (1).

Again referring primarily to FIG. 2 through FIG. 9, the housing (46) can have of a numerous and wide variety of dimensional relations capable of housing the functional components of the temperature threshold monitoring system (1). As to particular embodiments, the housing (46) can have relatively lesser dimensional relations such that the temperature threshold monitoring system (1) can be removably coupled or affixed to a dependent object (9). As to particular embodiments, the relatively lesser dimensional relations can be suitable for coupling or affixing the temperature threshold monitoring system (1) to a living entity having relatively lesser dimensional relations, such as an infant, a toddler, an animal, or the like. For example, as to particular embodiments having a generally heart-shaped housing (46), the housing width (48) can be about 5 centimeters (about 2 inches), the housing length (49) can be about 5 centimeters (about 2 inches), and the housing thickness (50) can be about 1.3 centimeters (about 0.5 inches).

Again referring primarily to FIG. 2 through FIG. 9, the temperature threshold monitoring system (1) can further include a clip element (51) coupled to the housing (46). As an illustrative example, the clip element (51) can include a spring-loaded clip element (51), which can removably couple the housing (46) to a dependent object (9). As an additional illustrative example, the clip element (51) can be configured as a mechanical fastener, such as a safety pin. As yet an additional illustrative example, the clip element (62) can be configured as a pair of matable elements, which can be coupled one each to the housing (46) and the dependent object (9). Upon mating engagement of the pair of matable elements, the housing (46) can be removably coupled to the dependent object (9).

As to particular embodiments, the microcontroller (1) can further include a transmission module (52) operable to generate a transmission signal (53), such as a wireless signal, when the temperature sensor (4) senses an ambient temperature (2) within the discrete space (3) which corresponds to a predetermined low-temperature threshold (7), a predetermined high-temperature threshold (8), or combinations thereof. The transmission signal (53) can be configured for reception by a remote device (54), for example a hand-held device such as a smartphone, a slate or pad or tablet device, a personal digital assistant, a cell phone, a remote computer, or other similar electronic device.

As to particular embodiments, the temperature threshold monitoring system (1) can further include a Global Positioning System (GPS) location module (55) operable to generate a location signal (56), whereby the location signal (56) can communicate the location of the dependent object (9) to a remote device (54), for example a hand-held device such as a smartphone, a slate or pad or tablet device, a personal digital assistant, a cell phone, a remote computer, or other similar electronic device.

As to particular embodiments, the temperature threshold monitoring system (1) can further include a sleep mode module (57) configured to generate a sleep mode signal (58), which commands the microcontroller (5) to enter a sleep mode, during which one or more components of the temperature threshold monitoring system (1) consume a lesser amount of power in relation to an awake mode when one or more components of the temperature threshold monitoring system (1) consume a greater amount of power.

As an illustrative example, the sleep mode module (57) can generate a sleep mode signal (58) after the timer module (36) measures a predetermined period of measured time (37) during which the sensed ambient temperature (12) is about 10 degrees lesser than the predetermined low-temperature threshold (7) or about 10 degrees greater than the predetermined high-temperature threshold (8). During the sleep mode, the temperature sensor (4) can intermittently sense the ambient temperature (2), correspondingly intermittently generate a temperature sensor signal (13) receivable by the microcontroller (5). As to particular embodiments, the temperature threshold monitoring system (1) can be awoken from the sleep mode to enter the awake mode when the temperature sensor (4) senses an ambient temperature (2) which is about 5 degrees greater than the predetermined low-temperature threshold (7) or about 5 degrees lesser than the predetermined high-temperature threshold (8). As to other particular embodiments, the temperature threshold monitoring system (1) can be awoken from the sleep mode to enter the awake mode by mechanical activation, such as the depression of an on/off button (59) or an awake mode button (60).

It should be appreciated that the particular microprocessor implementations shown and described herein are illustrative of the invention and are not intended to otherwise limit the scope of the present invention in any way. Indeed, for the sake of brevity, conventional data networking, application development, or other functional aspects of the systems (or components of the individual operating components of the systems) may not be described in detail herein. Furthermore, the connecting lines shown in one or more figures contained herein are intended to represent exemplary functional relationships and/or physical couplings between the various elements. It should be noted that many alternative or additional functional relationships or physical connections may be present in a practical temperature threshold monitoring system (1).

It will be understood that each functional block of the block diagrams and flowchart illustrations, and combinations of functional blocks in the block diagrams and flowchart illustrations, respectively, can be implemented by computer program code, which may be loaded onto a general purpose microcontroller, a special purpose microcontroller, or other programmable data processing apparatus to produce a machine, such that the instructions execute on the microprocessor or other programmable data processing apparatus to implement the functions specified in the functional blocks of the block diagrams and flowchart illustrations.

The computer program code may also be stored in a computer-readable memory that can direct a microcontroller or other programmable data processing apparatus to function in a particular manner, such that the computer program code stored in the computer-readable memory produce an article of manufacture including instruction means which implement the function specified in the functional blocks of the block diagrams and flowchart illustrations. The computer program code may also be loaded onto a microcontroller or other programmable data processing apparatus to cause a series of operational steps to be performed by the microcontroller or other programmable apparatus to produce a microcontroller-implemented process such that the computer program code which executes on the microcontroller or other programmable data processing apparatus provides steps for implementing the functions specified in the functional blocks of the block diagrams and flowchart illustrations.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based microcontroller systems which perform the specified functions or steps, or suitable combinations of special purpose hardware and computer program code.

A method of making a temperature threshold monitoring system (1) for monitoring an ambient temperature (2) within a discrete space (3) includes: providing a temperature sensor (4); and communicatively coupling a microcontroller (5) to the temperature sensor (4), the microcontroller (5) configured to generate an alert indicium (6) when the temperature sensor (4) senses an ambient temperature (2) within the discrete space (3) which corresponds to a predetermined low-temperature threshold (7) or a predetermined high-temperature threshold (8).

The method of making the temperature threshold monitoring system (1) can, but need not necessarily, further include configuring the temperature threshold monitoring system (1) for coupling to a dependent object (9) within the discrete space (3).

The method of making the temperature threshold monitoring system (1) can, but need not necessarily, further include configuring the temperature threshold monitoring system (1) for surface-mounting proximate the dependent object (9) within the discrete space (3). As to particular embodiments, the dependent object (9) is dependent upon an extractor for extraction from the discrete space (3), and the alert indicium (6) is configured to alert the extractor.

As to particular embodiments, exposure of the dependent object (9) to a temperature lesser than the predetermined low-temperature threshold (7) or greater than the predetermined high-temperature threshold (8) results in an undesirable condition of the dependent object (9).

As to particular embodiments, exposure of the dependent object (9) to the predetermined low-temperature threshold (7) or the predetermined high-temperature threshold (8) does not result in the undesirable condition of the dependent object (9).

As to particular embodiments, the alert indicium (6) generated when the temperature sensor (4) senses an ambient temperature (2) within the discrete space (3) which corresponds to the predetermined low-temperature threshold (7) or the predetermined high-temperature threshold (8) functions as a forewarning.

The method of making the temperature threshold monitoring system (1) can, but need not necessarily, further include configuring the predetermined low-temperature threshold (7) as less than about 10 degrees Celsius.

The method of making the temperature threshold monitoring system (1) can, but need not necessarily, further include configuring the predetermined low-temperature threshold (7) as selected from the group consisting of: less than about 10 degrees Celsius, less than about 5 degrees Celsius, less than about 0 degrees Celsius, less than about −5 degrees Celsius, less than about −10 degrees Celsius, less than about −15 degrees Celsius, less than about −20 degrees Celsius, less than about −25 degrees Celsius, less than about −30 degrees Celsius, and less than about −35 degrees Celsius.

The method of making the temperature threshold monitoring system (1) can, but need not necessarily, further include configuring the predetermined high-temperature threshold (8) as greater than about 30 degrees Celsius.

The method of making the temperature threshold monitoring system (1) can, but need not necessarily, further include configuring the predetermined high-temperature threshold (8) as selected from the group consisting of: greater than about 30 degrees Celsius, greater than about 32.5 degrees Celsius, greater than about 35 degrees Celsius, greater than about 37.5 degrees Celsius, greater than about 40 degrees Celsius, greater than about 42.5 degrees Celsius, greater than about 45 degrees Celsius, greater than about 47.5 degrees Celsius, greater than about 50 degrees Celsius, greater than about 52.5 degrees Celsius, greater than about 55 degrees Celsius, greater than about 57.5 degrees Celsius, and greater than about 60 degrees Celsius.

The method of making the temperature threshold monitoring system (1) can, but need not necessarily, further include configuring the predetermined high-temperature threshold (8) as selected from the group consisting of: less than about 60 degrees Celsius, less than about 57.5 degrees Celsius, less than about 55 degrees Celsius, less than about 52.5 degrees Celsius, less than about 50 degrees Celsius, less than about 47.5 degrees Celsius, less than about 45 degrees Celsius, less than about 42.5 degrees Celsius, less than about 40 degrees Celsius, less than about 37.5 degrees Celsius, less than about 35 degrees Celsius, less than about 32.5 degrees Celsius, and less than about 30 degrees Celsius.

The method of making the temperature threshold monitoring system (1) can, but need not necessarily, further include configuring the temperature sensor (4) to continuously sense the ambient temperature (2) and continuously generate the temperature sensor signal (13) when the temperature threshold monitoring system (1) is in use.

The method of making the temperature threshold monitoring system (1) can, but need not necessarily, further include configuring the temperature sensor (4) to continuously sense the ambient temperature (2) and intermittently generate the temperature sensor signal (13) when the temperature threshold monitoring system (1) is in use.

The method of making the temperature threshold monitoring system (1) can, but need not necessarily, further include configuring the temperature sensor (4) to intermittently sense the ambient temperature (2) and intermittently generate the temperature sensor signal (13) when the temperature threshold monitoring system (1) is in use.

The method of making the temperature threshold monitoring system (1) can, but need not necessarily, further include configuring the microcontroller (5) to generate the alert indicium (6) when the temperature sensor (4) senses the ambient temperature (2) within the discrete space (3) which corresponds to the predetermined low-temperature threshold (7) and the predetermined high-temperature threshold (8).

The method of making the temperature threshold monitoring system (1) can, but need not necessarily, further include providing a peripheral output element (25) configured to output the alert indicium (6).

The method of making the temperature threshold monitoring system (1) can, but need not necessarily, further include configuring the alert indicium (6) as a visually perceptible indication (40).

The method of making the temperature threshold monitoring system (1) can, but need not necessarily, further include configuring the alert indicium (6) as an audibly perceptible indication (41).

The method of making the temperature threshold monitoring system (1) can, but need not necessarily, further include providing a transmission module (52) operable to generate a transmission signal (53) when the temperature sensor (4) senses an ambient temperature (2) within the discrete space (3) which corresponds to the predetermined low-temperature threshold (7) or the predetermined high-temperature threshold (8).

The method of making the temperature threshold monitoring system (1) can, but need not necessarily, further include configuring the transmission signal (53) as a wireless signal.

The method of making the temperature threshold monitoring system (1) can, but need not necessarily, further include configuring the transmission signal (53) for reception by a remote device (54).

The method of making the temperature threshold monitoring system (1) can, but need not necessarily, further include providing a Global Positioning System location module (55) operable to generate a location signal (56).

The method of making the temperature threshold monitoring system (1) can, but need not necessarily, further include housing components of the temperature threshold monitoring system (1) within a housing (46).

The housing (46) can be formed from one or more of any of a numerous and wide variety of materials capable of housing components of the temperature threshold monitoring system (1), such as: metal, plastic, elastomer, thermoplastic, thermoplastic composite, polypropylene, fluorocarbon, polycarbonate, polymethylpentane, polyvinylchloride, polyethylene, polytetrafluoroethylene, silicone, polyacetal, polyisoprene, polybutadiene, chloroprene, butyl rubber, nitrile rubber, silicon rubber, or the like, or combinations thereof.

Further, the housing (46) can be made from any of a numerous and wide variety of processes depending upon the application, such as press molding, injection molding, fabrication, machining, printing, additive printing, or the like, or combinations thereof, as one piece or assembled from a plurality of pieces into an embodiment of the housing (46).

As can be easily understood from the foregoing, the basic concepts of the present invention may be embodied in a variety of ways. The invention involves numerous and varied embodiments of a temperature threshold monitoring system and methods for making and using such a temperature threshold monitoring system, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "signal" should be understood to encompass disclosure of the act of "signaling"—whether explicitly discussed or not—and, conversely, were there effectively disclosure of the act of "signaling", such a disclosure should be understood to encompass disclosure of a "signal" and even a "means for signaling." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the temperature threshold monitoring systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A method of using a temperature threshold monitoring system for monitoring an ambient temperature within a discrete space, said method comprising:
    obtaining said temperature threshold monitoring system comprising:
        a temperature sensor; and
        a microcontroller communicatively coupled to said temperature sensor, said microcontroller configured to generate an alert indicium which functions as a forewarning to forewarn that a temperature lesser than a predetermined low-temperature threshold or greater than a predetermined high-temperature threshold will likely be achieved within said discrete space;
    coupling said temperature threshold monitoring system to a child within said discrete space; and
    monitoring said ambient temperature within said discrete space.

2. The method of claim 1, wherein said temperature threshold monitoring system is configured for surface-mounting proximate said child within said discrete space.

3. The method of claim 1, wherein said child is dependent upon an extractor for extraction from said discrete space; and
    wherein said alert indicium is configured to alert said extractor.

4. The method of claim 3, wherein exposure of said child to a temperature lesser than said predetermined low-temperature threshold or greater than said predetermined high-temperature threshold results in an undesirable condition of said child.

5. The method of claim 4, wherein exposure of said child to said predetermined low-temperature threshold or said predetermined high-temperature threshold does not result in said undesirable condition of said child.

6. The method of claim 1, wherein said predetermined low-temperature threshold is less than about 10 degrees Celsius.

7. The method of claim 1, wherein said predetermined high-temperature threshold is greater than about 30 degrees Celsius.

8. The method of claim 1, wherein said microcontroller is configured to generate said alert indicium when said temperature sensor senses said ambient temperature within said discrete space which corresponds to said predetermined low-temperature threshold and said predetermined high-temperature threshold.

9. The method of claim 1, wherein said temperature threshold monitoring system further comprises a peripheral output element configured to output said alert indicium.

10. The method of claim 1, wherein said alert indicium comprises a visually perceptible indication.

11. The method of claim 1, wherein said alert indicium comprises an audibly perceptible indication.

12. The method of claim 1, wherein said temperature threshold monitoring system further comprises a transmission module operable to generate a transmission signal when said temperature sensor senses said ambient temperature within said discrete space which corresponds to said predetermined low-temperature threshold or said predetermined high-temperature threshold.

13. The method of claim 12, wherein said transmission signal comprises a wireless signal.

14. The method of claim 13, wherein said transmission signal is configured for reception by a remote device.

15. The method of claim 1, wherein said temperature threshold monitoring system further comprises a Global Positioning System location module operable to generate a location signal.

16. The method of claim 1, wherein said temperature threshold monitoring system further comprises:
- a housing which houses said temperature sensor and said microcontroller; and
- a clip element coupled to said housing, said clip element configured to removably couple said housing to said child via pincer action.

17. The method of claim 1, wherein said temperature threshold monitoring system further comprises:
- a housing which houses said temperature sensor and said microcontroller; and
- a clip element coupled to said housing, said clip element configured as a pin which facilitates removable coupling of said housing to said child.

18. The method of claim 1, further comprising alerting said extractor.

19. The method of claim 1, further comprising extracting said child from said discrete space.

20. A method of using a temperature threshold monitoring system for monitoring an ambient temperature within a discrete space, said method comprising:
- obtaining said temperature threshold monitoring system comprising:
  - a temperature sensor; and
  - a microcontroller communicatively coupled to said temperature sensor, said microcontroller configured to generate an alert indicium which functions as a forewarning to forewarn that a temperature lesser than a predetermined low-temperature threshold or greater than a predetermined high-temperature threshold will likely be achieved within a discrete space;
- coupling said temperature threshold monitoring system to a pet within said discrete space; and
- monitoring said ambient temperature within said discrete space.

* * * * *